United States Patent [19]

Leisterer et al.

[11] 4,056,801

[45] Nov. 1, 1977

[54] APPARATUS FOR LOCATING SOURCES OF SOUND IN WATER

[75] Inventors: Reinhard Leisterer, Bremen; Manfred Oelfke, Achim; Hans Woiczik, Oyten; Hans-Joachim Meyer; Rolf Ostermeier, both of Bremen, all of Germany

[73] Assignee: Fried. Krupp Gesellschaft mit beschrankter Haftung, Essen, Germany

[21] Appl. No.: 609,405

[22] Filed: Sept. 2, 1975

Related U.S. Application Data

[63] Continuation-in-part of Ser. No. 503,945, Sept. 6, 1974, abandoned.

[30] Foreign Application Priority Data

Sept. 8, 1973 Germany .............................. 2345381

[51] Int. Cl.² .............................................. G01S 3/80
[52] U.S. Cl. ........................................ 340/2; 340/6 R
[58] Field of Search ............................ 340/2, 6 R, 8 S

[56] References Cited

U.S. PATENT DOCUMENTS

3,116,471  12/1963  Coop ........................................ 340/2

Primary Examiner—Richard A. Farley
Attorney, Agent, or Firm—Spencer & Kaye

[57] ABSTRACT

Apparatus for locating sources of sound in water, including a hydrophone system which is suspended from a buoy after being dropped into the water and whose one given reference axis is automatically aligned with the magnetic field of the earth by mechanically coupling the hydrophone system with a compass magnet (north reference). The hydrophones of the hydrophone system are electrically connected with a switching or control box by means of transmission wires which are insulated with an elastic plastic and pass freely through the water and the hydrophone system is mechanically fastened to the switching box to be rotatable in a recoilless manner about an axis which is perpendicular to the surface of the earth. The control box is in turn connected to the buoy by means of an elastic suspending cable and an electrical connecting cable.

22 Claims, 7 Drawing Figures

APPARATUS FOR LOCATING SOURCES OF SOUND IN WATER

CROSS REFERENCE TO RELATED APPLICATION

This application is a continuation-in-part of Application Ser. No. 503,945, filed Sept. 6, 1974, now abandoned.

BACKGROUND OF THE INVENTION

The present invention relates to an apparatus for locating sources of sound in water. More particularly, the present invention relates to such an apparatus which includes a hydrophone system whose one given reference axis is automatically aligned with the earth's magnetic field by mechanically coupling the hydrophone system with a compass magnet (north reference) and with the hydrophone system being set out in the water while suspended under a buoy at a distance therefrom.

It is known to build a hydrophone system into a floating buoy element and to drop such an arrangement from an aircraft. As soon as the buoy lands on the water, the hydrophone system is released and exits from the buoy body and is submerged to a given depth. Received sound signals in the water are then transmitted by the hydrophone system via a cable to a transmitter fastened to the buoy body where the water sound signals are converted and emitted. These emitted signals are received by the aircraft and are evaluated according to known evaluation processes.

German Offenlegungsschrift (Laid-Open Patent Application) No. 1,516,645, published on June 26, 1969 ( which corresponds to a combination of U.S. Pat. Nos. 3,286,224 and 3,319,218 issued Nov. 15, 1966 and May 9, 1967, respectively) discloses an arrangement in which the hydrophone system is rotated to have its reference axis in the north-south direction of the magnetic field of the earth in order to obtain the direction of the impinging water sound signals with reference to north. Such a device, however, can furnish only inaccurate ranging information since the connecting wires which are disposed between the hydrophones and the buoy body for holding the hydrophones and for transmitting the ranging information prevent accurate alignment of the hydrophone with the north direction.

SUMMARY OF THE INVENTION

It is the object of the present invention to provide a coupling of a hydrophone system with a compass magnet wherein the coupled system can be aligned with the magnetic north pole of the earth without having to overcome friction and torque.

This is basically accomplished, according to the present invention, in that, in an apparatus for locating sources of sound in water including a hydrophone system which is mechanically coupled to a compass magnet (north reference) in order that a given reference axis of the hydrophone system can be aligned with the earth's magnetic field and a buoy from which the hydrophone system is suspended after being dropped into the water, the hydrophones of the hydrophone system are connected via transmission wires, which pass through the water and which are electrically insulated with an elastic plastic material, to a control or switching box, an elastic suspending cable and an electrical signal connecting cable extend from the control box to the buoy, and the hydrophone system is fastened to the switching box so that it can rotate about an axis perpendicular to the surface of the earth in a recoiless manner, i.e. without a countertorque.

According to one feature of the invention, the hydrophone system is preferably held in the switching or control box during dropping of the buoy into the water and release of the switching box. In such case, the arresting or holding means are released a given time after dropping of the buoy by means of a counter or timer which is also disposed in the control box.

According to a further feature of the invention, a blocking circuit is provided in the buoy which interrupts the electrical connection between the hydrophones and an electronic evaluation system or circuit in the buoy for a given period of time in order to prevent the emission of erroneous signals by the transmitter in the buoy. This given time period is selected so that the hydrophone system can safely sink to its intended depth and align itself in the north-south direction.

According to one embodiment of the invention, a water-permeable cover is fastened to the control box in which the hydrophone system and the compass magnet coupled thereto are enclosed. The rotatable mounting of the hydrophone system to the control box is advantageously designed as a conical bearing for the hydrophone system which is in the cover. A conical bearing on only one point similar to a compass needle attached below the hydrophone system is particularly advantageous whenever it is expected that the hydrophone system will move.

According to a further embodiment of the invention, no cover is provided for the control box; rather the hydrophone system is fastened above its center of gravity to a chord which connects the hydrophone system with the control box. Such a chord is advisably made of a prestretched polyamide yarn which will stretch only slightly and will recoil only slightly after twisting movements so that alignment of the hydrophone system is not impeded.

A rotatable joint connection is provided in the center of a supporting plate for the hydrophone system and the compass magnet to always assure a vertical position of the hydrophone system in the water. The chord from the control box is also fastened to this joint connection.

In order to suppress pitching and yawing of the switching box, a further advantageous feature of the present invention provides that damping wings are attached to the control box which are extended by means of a drive mechanism. The damping wings prevent heavy movement of the control box even if the buoy moved heavily up and down with the waves since the control box and buoy are mechanically coupled to the elastic suspending cable which participates in the movements of the buoy and since the loose electrical connecting cable between buoy and switching box leaves sufficient play for the buoy movements.

According to a further embodiment of the invention, a section of the connecting cable also serves as the mechanical connection between the buoy and the control box while the elastic suspending cable is fastened only to the buoy, and the upper portion of the connecting cable is left mechanically unstressed. This mechanical and electrical connection between buoy and control box is would on a reel or drum when the buoy is dropped, with the direction of winding alternating in sections within the drum. When the switching box is lowered, this connection will unroll without twist.

As pointed out above, transmission wires which transmit the signals from the hydrophones to the control boxes are disposed between the hydrophone system and the control box. In an advantageous feature of the present invention reel bodies are provided in the control box and/or at each hydrophone, which reel bodies accommodate the transmission wires. The reels are wound in opposite directions when they are installed so that upon release of the hydrophone system and alignment with the north direction the transmission wires are moved out of the reel bodies without twist. Corresponding reels in the control box and at the hydrophone which wind in the opposite direction prevent the formation of loops in the transmission wires.

In a further feature of the invention, each hydrophone has assigned to it an impedance converter which simultaneously effects a preamplification of the ranging signals and thus assures transmission or the ranging signals without interference through the transmission wires to the control box.

The advantages of the present invention in which a buoy is dropped from an aircraft are particularly that the hydrophone system, when it is dropped into the water, will sink to a given depth and will automatically turn itself into the north direction without any influence of movements by the buoy and without a countertorque being applied to the suspending mechanism; that the transmission of the north referenced ranging signals from the hydrophone system to the buoy is effected over transmission wires which are separated from the suspension system, which are very thin and which unwind when the hydrophone system is lowered and aligned with the north direction so that no moment acts on the hydrophone system and the formation of loops is prevented.

DETAILED DESCRIPTION OF THE PREFERRED EMBODIMENTS

Figure 1:
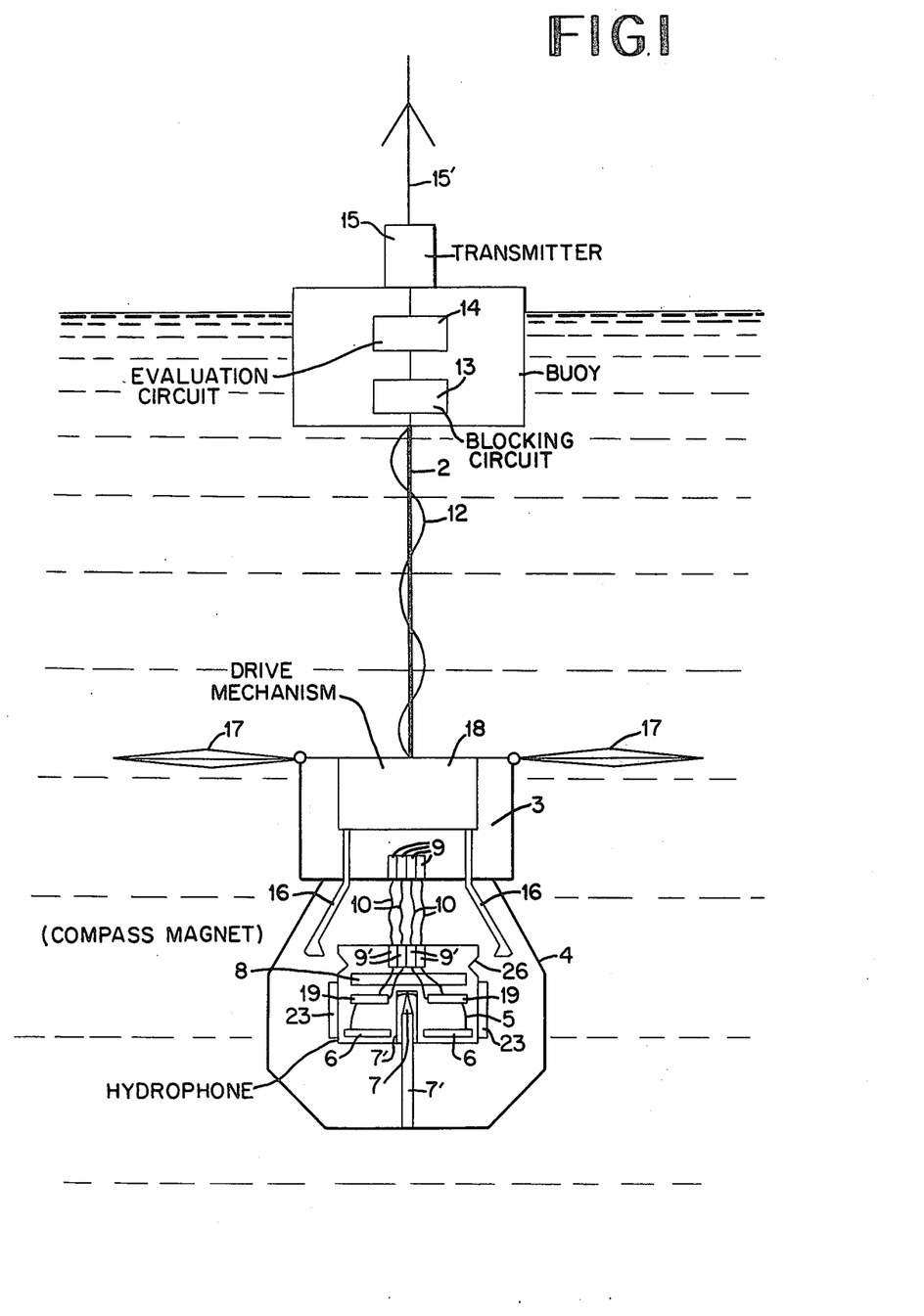
FIG. 1 is a schematic illustration of a buoy with a hydrophone system in a conical mount according to one embodiment of the invention.

Referring now to FIG. 1, there is shown a buoy 1 which was dropped, for example, from an aircraft to the surface of the water. In the water a switching or control box 3 is released from the buoy 1 and is suspended therebelow at a desired distance by means of an elastic suspending cable 2 which may, for example, be formed of rubber. Such a suspension cable is disclosed, for example in British Pat. No. 1,170,547. The release of the control box 3 from the buoy 1 may be initiated by a shock release mechanism mounted in the buoy which responds to the shock of the buoy striking the surface of the water. Such a shock release mechanism is shown for example in U.S. Pat. No. 3,708,812, issued Jan. 9, 1973.

Fastened to the lower surface of the control box 3 is a cover or cage 4 which is permeable to water and constructed, for example, of a plurality of spaced bars. Within cover 4, a supporting plate or housing 5 is disposed on which a plurality of hydrophones 6 are arranged in a known manner. The supporting plate 5 is mounted in the cover 4 by means of a conical bearing arrangement 7 which engages the plate 5 above its center of gravity. As shown, the bearing arrangement 7 is of the type commonly used for a compass and includes an upwardly extending support rod 7' which is mounted on the bottom of the cover 4 and has a conically shaped needle point at its upper end, and an axial blind bore 7" formed in the lower surface of the plate or housing 5 and having a concave end which is above the center of gravity of the plate 5 and engages the needle point. A compass magnet 8 is fastened in the supporting plate 5 to align the plate 5 and hence the hydrophone system with the magnetic north direction of the earth.

Mounted in the center of the lower surface of the control box 3 and the upper surface of the supporting plate 5 are a plurality of reels or coil bodies 9 and 9', respectively, on which the transmission wires 10 for the transmission of ranging signals from the respective hydrophones 6 are wound. Each wire 10 is wound on one reel 9 and on one reel 9' with the winding on the respective reels being in opposite directions. Thus, when the supporting plate 5 performs a rotary movement on the bearing arrangement 7, the transmission wires 10 move out of their respective reels 9 and 9'. Due to the opposite direction of winding it is assured that the transmission wires 10 are unwound without knots and without the formation of loops. It should be noted, however, that if the distance between the control box 3 and supporting plate 5 is very short, the transmission wires 10 need not be wound on reels 9 or 9'. In order to keep the resetting moment small in the embodiment of the invention, the transmission wires 10 are made of very thin wire. Additionally, since the wires 10 are in contact with the water, they are provided with an insulating coating. The wires 10 can be formed, for example, of lacquered copper wires having a cross section of 0.02 mm.

Ranging signals received by the hydrophones 6 are transmitted from the control box 3 via an electrical connecting cable 12, which is loosely arranged parallel to the elastic supporting cable 2, to the buoy 1 which contains a blocking circuit 13 and a series-connected signal evaluation circuit or system 14 of conventional design. The output of the signal evaluation system 14 is connected with a transmitter 15 which transmits the ranging information via an antenna 15'. The blocking circuit 13 which may, for example, comprise a switch which is controlled by a timer or counter blocks the signal transmission path from the cable 12 during the time interval between dropping of the buoy 1 into the water and the accurate alignment of the supporting plate 5 so that no ranging information is transmitted to the electronic signal evuluation system during this time interval.

In order to prevent stressing of the conical bearing arrangement 7 during dropping of the buoy 1 into the water, the control box 3 is provided with a plurality of movable arms 16 which engage in a groove 26 formed in the periphery of the support plate 5 during the dropping operation and thus support and hold the plate 5 out of engagement with the support rod 7'. The movement of the arms 16 is controlled by a drive mechanism 18 which spreads the arms 16 to release the hold on the support plate after a certain time interval has elasped following the time that the buoy lands in the water.

As soon as the hold on supporting plate 5 by the arms 16 has been released, the supporting plate 5 drops to the tip of the conical bearing 7 and the transmission wires 10 unwind out of the reel bodies 9 and 9'. At this point in time any possible twist in the elastic suspending cable 2 between buoy 1 and control box 3 has been compensated so that only a few revolutions of the supporting plate 5 relative to the cover 4 or vice versa need be expected.

As shown in FIG. 1, according to a further advantageous feature of the invention, the control box 3 is provided with a plurality of laterally extendable attenuating or damping wings 17 which are extended by means of the drive mechansim 18 after a given period of time. The elastic suspending cable 2 and the attenuation wings 17 assure that the movement of the supporting plate 5 is attenuated if the buoy 1 moves up and down during heavy seas.

According to a further feature of the present invention, impedance converters 19, which may for example be emitter follower amplifiers, are mounted in the supporting plate 5 and are connected in series with the respective hydrophones 6 to assure interference-free transmission of the ranging signals.

Figure 2:
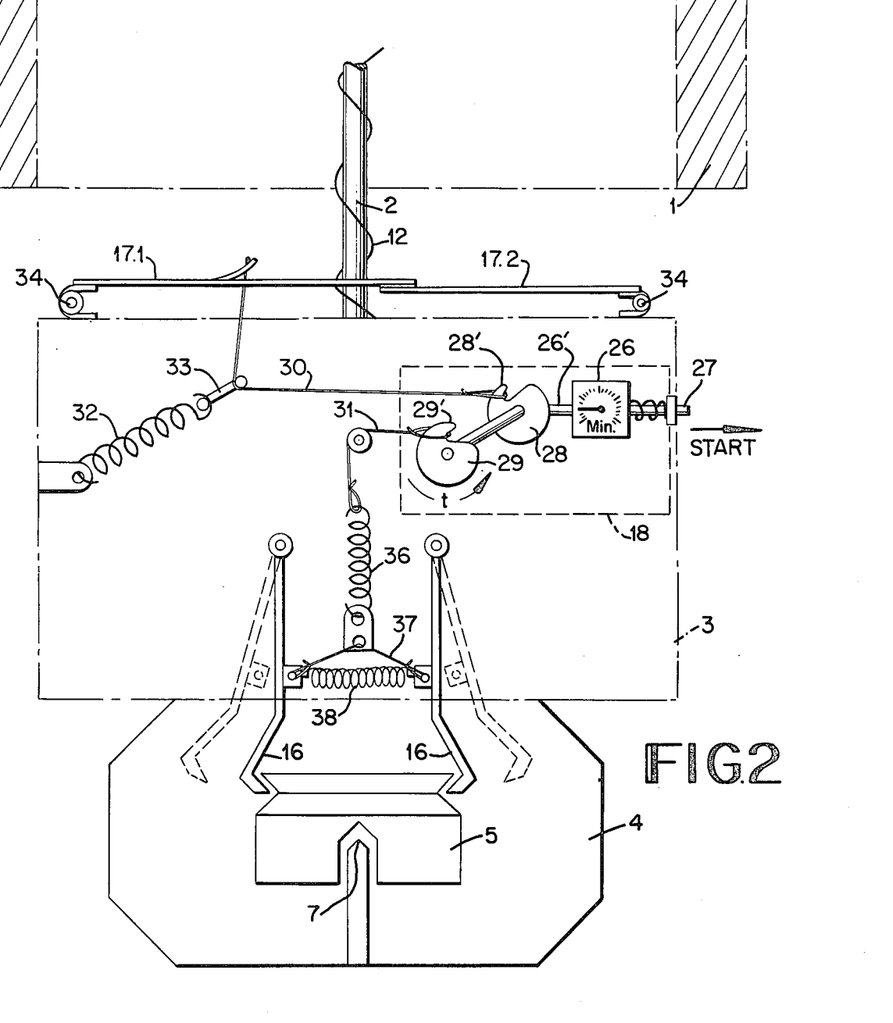
FIG. 2 is a more detailed schematic illustration of the control box and drive mechanism for arresting and releasing the damping wings and the support plate with the hydrophones according to the embodiment of FIG. 1.

As shown in FIG. 2, the drive mechanism 18 of the control box 3 includes a mechanical spring operated timing mechanism 26 which is wound when the buoy and hydrophone system arrangement is assembled. Operation of the timing mechanism 26 however is blocked by means of a pin 27, which is retained in a retracted position until the control box 3 leaves the buoy 1. At this time the timing mechanism 26 begins to run down (see in this connection the time scheme of FIG. 7). Coupled to the output shaft 26' of the timing mechansim 26 for rotation therewith are two discs 28 and 29 having offset tongues 28' and 29' on their respective periphery. A first nylon tape 30, which serves to arrest the attenuation wings 17, and a second nylon tape 31, which serves to arrest the supporting plate 5 with the hydrophones 6, are hooked into the tongues 28' and 29' respectively by means of loops formed of the tapes.

As shown, the attenuation wings 17 are folded together above the control box 3, with one wing 17.1 overlapping the other wing 17.2. The nylon tape 30 has one end fastened to the first wing 17.1 and extends through a ring 33 to the tongue 28' of the disc 28. In order for the nylon tape 30 to securely hold the first wing 17.1 in the folded position, it is tautly tensioned by a tension spring 32, which is connected between the ring 33 and the wall of the control box 3. As the timing mechanism 26 is running down, disc 28 rotates in the direction of the arrow and the tension of tension spring 32 decreases until the loop of the nylon tape 30 slips off of the tongue 28' on the first disc 28. The attenuation wings 17 are then unfolded by means of two springs 34 and 34' disposed in the joints of the wings. The nylon tape 30 is then pulled out of the control box 3 by wing 17.1.

The supporting plate 5 in the arrangement of FIG. 1 is held above the conical bearing arrangement 7 by means of two arresting arms 16. As shown in FIG. 2, the arresting arms 16 are rotatably mounted in the control box 3 and are pulled or urged against the supporting plate 5 by a tension spring 36 which has one end connected with the nylon tape 31. The other end of tension spring 36 is connected to a further nylon tape 37 which in turn is connected with each of the arresting arms 16 below their pivot points.

Once the attenuation wings 17 have been unfolded, the timer 26 continues to run down so that after a further period of time, which is determined by the offset of the tongues of discs 28 and 29, the loop of nylon tape 31 is also released by disc 29. During this period of time the arresting arms 16, which are forced apart by a pressure spring 28 disposed therebetween, slowly slide away from supporting plate 5 and the supporting plate carefully seats itself on conical bearing 7.

Figure 3:
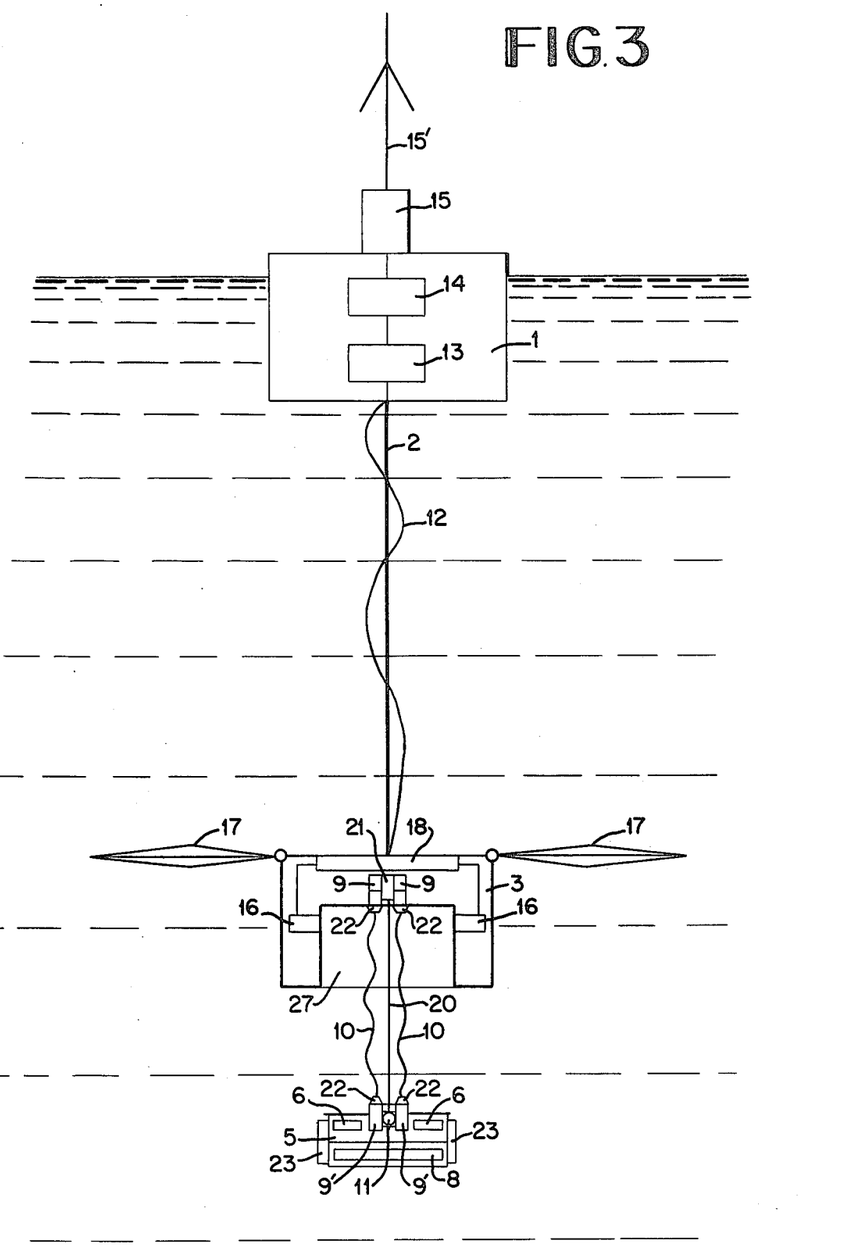
FIG. 3 is a schematic illustration of a buoy with a hydrophone system which is suspended from a chord according to a further embodiment of the invention.

According to the embodiment of the present invention shown in FIG. 3, the buoy 1 is connected with the control box 3 via the elastic suspending cable 2, and the supporting plate 5' with the hydrophones 6 and the compass magnet 8 is suspended from the control box 3 by a chord 20 which is made, for example, of prestretched polyamide. The control box 3, in this embodiment is provided with a cavity 27 in the bottom surface thereof in which the supporting plate 5' is located and held by a holding or arresting means 16' during the dropping of the buoy.

When the supporting plate 5' is being held in the cavity 27 of the control box 3 by arresting means 16', chord 20 is wound up on a reel 21. The drive mechanism 18 actuates the arresting means 16' to release supporting plate 5' after the desired time interval.

When chord 20 is being unwound from reel 21, the transmission wires 10 are also unwound from reel bodies 9 and 9' through guide nozzles 22. Guide nozzles 22 assure dependable unwinding of the transmission wires over the relatively long path between control box 3 and supporting plate 5'. A rotatable joint connection 11 to which chord 20 is connected is provided in the center of supporting plate 5'. This joint connection 11, which, as illustrated, is a ball joint, assures that the plate 5' and hence the hydrophone system is always vertically aligned.

In order to attenuate the movements of the switching box 3 caused by heavy seas, damping wings 17 are also provided which are actuated by drive mechansim 18. The other illustrated structural features correspond to those which are described in connection with FIG. 1.

Figure 4:
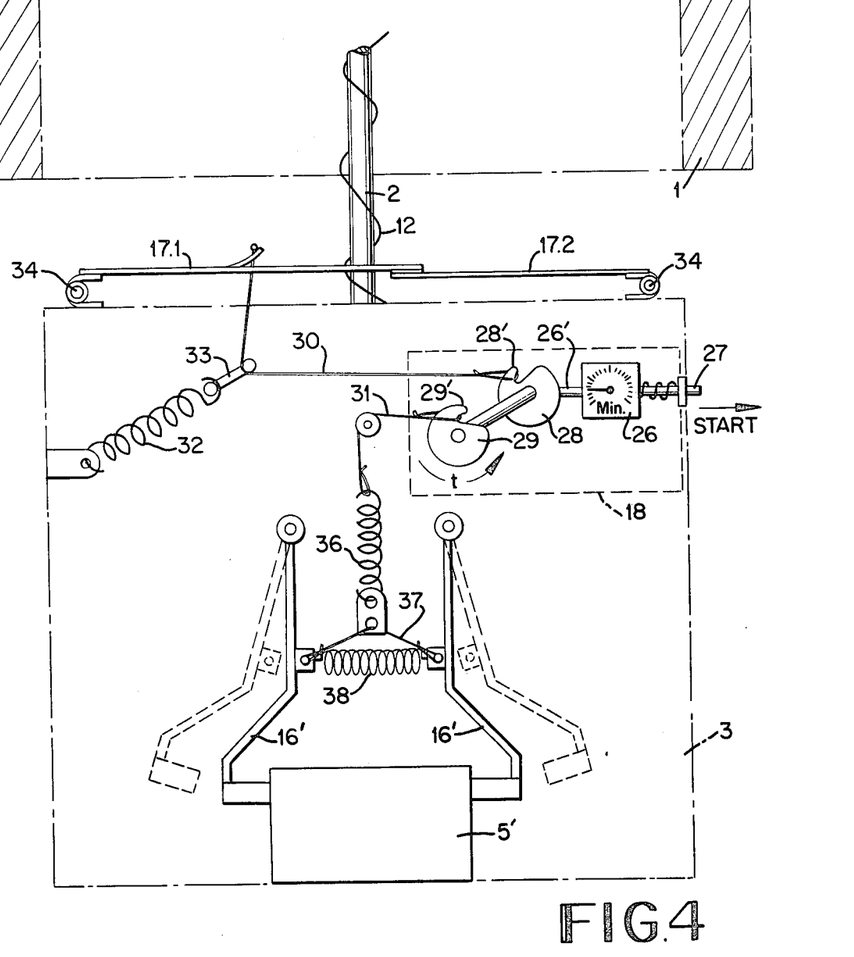
FIG. 4 is a schematic illustration similar to FIG. 2 for the embodiment of FIG. 3.

FIG. 4 shows an arrangement for arresting the supporting plate 5' of the embodiment of FIG. 3. As can be seen, this arrangement is substantially the same as that of FIG. 2. The arresting means or arms 16' press against the supporting plate 5' from both sides and keep it within control box 3. When the arresting arms 16' are relaxed, the support plate 5' is released and the nylon chord or rope 20 (FIG. 3) unrolls to lower the supporting plate 5' to the desired depth.

According to a further feature of the invention, buoyancy or float elements 23 may be fastened to the supporting plate 5 or 5' as shown schematically in FIGS. 1 and 3. The use of such buoyancy elements 23, with the resultant reduction in the negative buoyancy of the hydrophone system in the water, causes the bearing pressure of the conical bearing 7 of FIG. 1 to be reduced and thus the bearing friction to also be reduced. With the embodiment of FIG. 3, the use of buoyancy or updrift elements 23 permits the diameter of chord 20 to be selected so small that its reset moment becomes disappearingly small.

Figure 5:
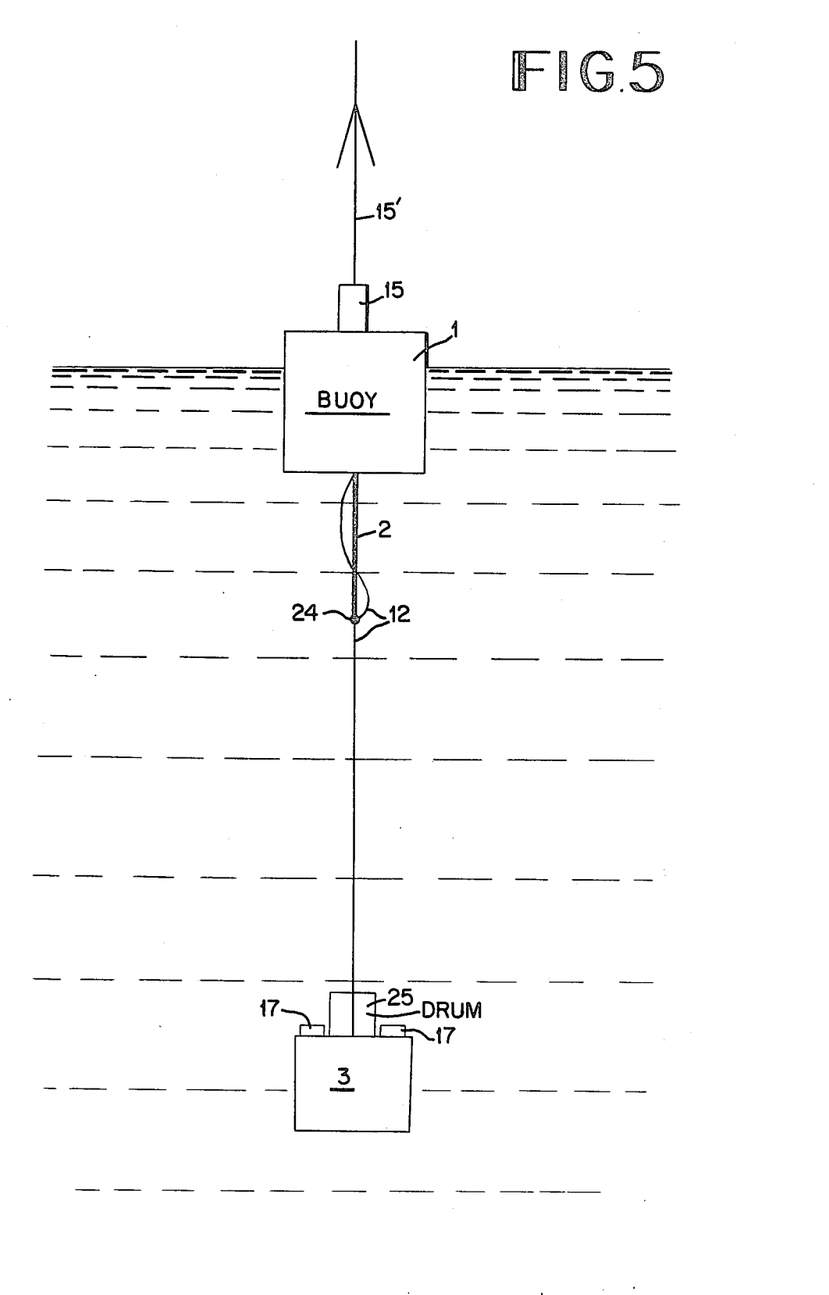
FIG. 5 is a schematic illustration showing an alternate embodiment of the connection between the buoy and the control box.

FIG. 5 shows a modification of the mechanical connection between the buoy 1 and the control box 3 of FIGS. 1 and 3. As shown in FIG. 5, the electrical connecting cable 12, as in the embodiments of FIGS. 1 and 3, is electrically connected between the buoy 1 and the control box 3. The elastic suspending cable 2, however, has one end permanently connected to the buoy 1 as in the previous embodiments but has its other end 24 permanently connected to the electrical connecting cable 12 at a point between the buoy 1 and the control box 3. The control box 3 is thus supported both by the suspending cable 2 and the electrical connecting cable 12. The portion of the electrical connecting cable 12 extending from the end 24 of cable 2 to the buoy 1 is provided with sufficient slack so that the elastic suspending cable 2 can unimpededly expand during the up and down movement of buoy 1 during heavy seas without the connecting cable 12 restricting such movement.

During dropping of the buoy, the control box and the hydrophone system into the water, the entire mechanical connection, i.e., cables 2 and 12, are wound on a drum mounted on the control box 3 from which these cables are unwound when the control box 3 is released from the buoy 1. The cables 2 and 12 are preferably wound on the drum 25, prior to dropping, in sections with alternating winding direction. This assures that the control box 3 is lowered without any significant rotation during the unwinding process.

It should be noted that although not specifically shown, a drum, such as drum 25, on which the cables 2 and 12 are initially wound may be provided in each of the embodiments of FIGS. 1 and 3.

Figure 6:
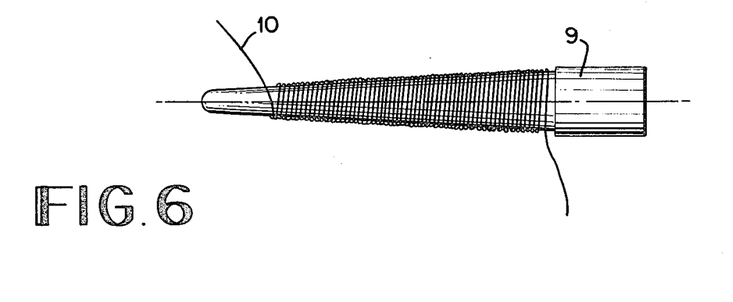
FIG. 6 is an illustration of a coil box with a coil of thin wire for use in the system of the invention.

FIG. 6 shows a preferred embodiment of a reel or coil body for thin wires 10. The coil body 9 is preferably a conically tapered shaft on which the coiled wires are wound oppositely to one another, i.e., of the coil bodies 9 at the switching box 3 and at the support plate 5 half have a given direction of winding, the other half have the opposite direction of winding so that formation of knots in the thin wires 10 is avoided. The finished coil bodies 9 with their wound coils of wire 10 are greased in order to keep the thin wires 10 on the coil bodies.

Figure 7:
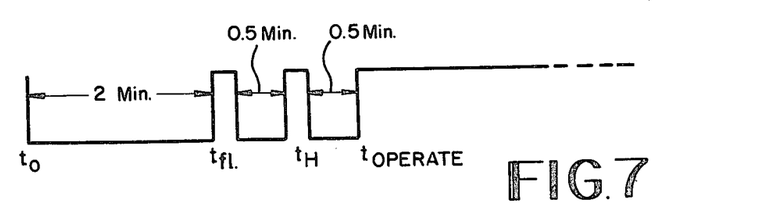
FIG. 7 shows the time sequence of operation of the system of the invention beginning with the setting of the buoy on the surface of the water and ending when the hydrophones are in their operable condition.

Turning now to FIG. 7 there is shown the time sequence for the mechanical functions beginning with the time the buoy 1 with the attached hydrophone system according to the invention hits on the surface of the water. At time $t_O$ the control box 3 is released from the buoy 1, releasing the pin 27 so that the timing mechanism 26 in drive mechanism 18 begins to run down. At time $t_{f1}$, after a period of, for example, two minutes, in which the control box 3 has safely dropped away from the buoy body 1 on support cable 2, the damping or attenuating wings 17 are released. After a further period of time of, for example, one-half minute, within which the position of the control box 3 in the water has been stabilzed by the unfolded damping wings 17, the support plate 5 is released at time $t_H$ and the system aligns itself to the magnetic north pole. At time $t_{operation}$ the blocking circuit 13 for the transmission of the hydrophone signals is released to permit the transmission of data signals.

It will be understood that the above description of the present invention is susceptible to various modifications, changes and adaptations and the same are intended to be comprehended within the meaning and range of equivalents of the appended claims.

What is claimed is:

1. In an apparatus for locating sources of sound in water, including a hydrophone system which is mechanically coupled with a compass magnet (north reference) so that one given reference axis of the hydrophone system is automatically aligned with the magnetic field of the earth, a buoy, and means for suspending the hydrophone system from said buoy, after being dropped into the water; the improvement wherein said means for suspending comprises, in combination:
   a control box;
   a plurality of thin transmission wires, each of which is insulated with an elastic plastic coating and passes freely through the water, electrically connecting the hydrophones of the hydrophone system to said control box;
   an elastic suspending cable and electrical connecting cable extending between said control box and said buoy; and,
   means for mechanically connecting said hydrophone system to said control box so that seaid hydrophone system is suspended below said control box and, when operable, is rotatable in a recoiless manner about an axis which is perpendicular to the surface of the earth.

2. Apparatus as defined in claim 1 wherein said control box further includes: means for holding the hydrophone system in a fixed position during the dropping of said apparatus into the water; and drive means for releasing said holding means a given time interval after landing in the water.

3. Apparatus as defined in claim 2 wherein: said hydrophone system and said compass magnet are accommodated in a single support plate; said holding means comprises a pair of pivotal arms mounted in said control box and means for urging said arms against opposite sides of said support plate to hold same; and said means for releasing includes a timing means connected to said means for urging, and means for starting said timing means upon release of said control box from said buoy to cause said timing means to release said means for urging after said given time interval.

4. Apparatus as defined in claim 3 wherein said means for urging comprises a first tape connected to each of said pivotal arms below its pivot point, a tension spring having one end connected to said tape and its other end connected to one end of a second tape, and means for releasably connecting the other end of said second tape to the output of said timing means.

5. Apparatus as defined in claim 4 further including a compression spring for normally urging said arms apart.

6. Apparatus as defined in claim 4 wherein said means for releasably connecting includes a disc connected to an output shaft of said timing means for rotation therewith, said disc having a tongue on the periphery thereof which engages a loop in the end of said second tape.

7. Apparatus as defined in claim 2 wherein said buoy includes an electronic signal evaluation circuit and a blocking circuit means, having its input connected to said electrical connecting cable and its output connected to the input of said signal evaluation circuit, for blocking the electrical transmission of ranging signals between said control box and said electronic signal evaluation circuit for a given time interval after dropping of said apparatus into the water.

8. Apparatus as defined in claim 7 wherein said hydrophone system and said compass magnet are accommodated in a single support plate, and wherein said means for mechanically suspending said hydrophone system includes means for rotatably engaging said support plate above its center of gravity.

9. Apparatus as defined in claim 8 wherein said control box further includes a sound-permeable cover which is fastened to said control box and encloses said hydrophone system and said compass magnet.

10. Apparatus as defined in claim 9 wherein said means for rotatably engaging said support plate comprises a conical bearing arrangement.

11. Apparatus as defined in claim 10 wherein said conical bearing arrangement comprises an upwardly extending support rod, having a conical needle tip, mounted on said cover, and an axial blind bore in the bottom of said support plate and having a concave end which is above the center of gravity of said plate, said support rod extending into said bore and engaging said concave end.

12. Apparatus as defined in claim 7 wherein said means for mechanically suspending said hydrophone system from said control box comprises a chord having one end attached to said control box and its other end attached to said supporting plate above its center of gravity.

13. Apparatus as defined in claim 12 wherein said supporting plate is provided with a rotatable joint connection to which said other end of said chord is attached.

14. Apparatus as defined in claim 12 wherein said control box further includes a reel on which said chord is wound during the dropping of said apparatus into the water and wherein said drive means actuates said reel to unwind said chord after said given time interval.

15. Apparatus as defined in claim 8, further comprising a pair of reels for each of said transmission wires with one of said pair of reels being centrally located on said control box and the other of said reels being centrally disposed on said support plate, each of said wires being wound in opposite directions on its associated pair of reels.

16. Apparatus as defined in claim 15, further comprising a guide nozzle associated with each of said reels for guiding the respective said transmission wire into the water.

17. Apparatus as defined in claim 15, further comprising a respective impedance converter associated with each of the individual hydrophones, each of said impedance converters being connected between a respective hydrophone and the associated transmission wire.

18. Apparatus as defined in claim 8 wherein said control box is provided with a plurality of extendable, subsantially horizontally oriented damping wings.

19. Apparatus as defined in claim 18 wherein: said control box includes means for retaining said damping wings in a folded position during the dropping of said apparatus into the water; and said drive means is connected to said means for retaining for releasing same to extend said damping wings a given time interval after said apparatus lands in the water.

20. Apparatus as defined in claim 19 wherein said supporting plate of the hydrophone system is provided with buoyancy elements.

21. Apparatus as defined in claim 19, further comprising a drum on said control box on which said suspending cable and said connecting cable are wound in sections with alternating sense of rotation during the dropping of said apparatus into the water, said cables being unwound from said drum during the lowering of said control box from said buoy.

22. Apparatus as defined in claim 21 wherein said connecting cable has one end fastened to said control box, said elastic suspending cable has one end premanently connected to the buoy and its other end permanently connected with the connecting cable at a point between said control box and said buoy and said connecting cable extends from said point of connection with said suspending cable loosely parallel with the suspending cable to said buoy.

* * * * *